US009663690B2

(12) United States Patent
Chatterjee et al.

(10) Patent No.: US 9,663,690 B2
(45) Date of Patent: *May 30, 2017

(54) UV-CURABLE SILICONE RELEASE COMPOSITIONS

(71) Applicant: 3M INNOVATIVE PROPERTIES COMPANY, St. Paul, MN (US)

(72) Inventors: Joon Chatterjee, Bloomington, MN (US); Hae-Seung Lee, Woodbury, MN (US); Mark D. Purgett, Oakdale, MN (US); Jitendra S. Rathore, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 88 days.

This patent is subject to a terminal disclaimer.

(21) Appl. No.: 14/437,045

(22) PCT Filed: Oct. 31, 2013

(86) PCT No.: PCT/US2013/067636
§ 371 (c)(1),
(2) Date: Apr. 20, 2015

(87) PCT Pub. No.: WO2014/074372
PCT Pub. Date: May 15, 2014

(65) Prior Publication Data
US 2015/0247078 A1 Sep. 3, 2015

Related U.S. Application Data
(60) Provisional application No. 61/723,817, filed on Nov. 8, 2012.

(51) Int. Cl.
| | | |
|---|---|---|
| C09D 183/08 | (2006.01) |
| C09D 183/04 | (2006.01) |
| C09D 183/06 | (2006.01) |
| C08K 5/34 | (2006.01) |
| C09J 183/06 | (2006.01) |
| C08K 5/3492 | (2006.01) |
| C09J 7/02 | (2006.01) |
| C08G 77/16 | (2006.01) |
| C08G 77/26 | (2006.01) |

(52) U.S. Cl.
CPC ............ *C09J 183/06* (2013.01); *C08K 5/3492* (2013.01); *C09D 183/04* (2013.01); *C09D 183/06* (2013.01); *C09D 183/08* (2013.01); *C09J 7/0228* (2013.01); *C08G 77/16* (2013.01); *C08G 77/26* (2013.01)

(58) Field of Classification Search
CPC .. C09D 183/04; C09D 183/06; C09D 183/08; C08K 5/3492; C08G 77/18; C08G 77/16; C08G 77/26
See application file for complete search history.

(56) References Cited

U.S. PATENT DOCUMENTS

| | | |
|---|---|---|
| 2,676,182 A | 4/1954 | Daudt |
| 3,627,851 A | 12/1971 | Brady |
| 3,772,247 A | 11/1973 | Flannigan |
| 3,987,037 A | 10/1976 | Bonham |
| 4,329,384 A | 5/1982 | Vesley |
| 4,330,590 A | 5/1982 | Vesley |
| 4,609,574 A | 9/1986 | Keryk |
| 4,774,310 A | 9/1988 | Butler |
| 4,925,671 A | 5/1990 | Abber |
| 4,935,484 A | 6/1990 | Wolfgruber |
| 5,110,890 A | 5/1992 | Butler |
| 5,153,323 A | 10/1992 | Rossman |
| 5,187,045 A | 2/1993 | Bonham |
| 5,248,739 A | 9/1993 | Schmidt |
| 5,262,558 A | 11/1993 | Kobayashi |
| 5,302,685 A | 4/1994 | Tsumura |
| 5,308,887 A | 5/1994 | Ko |
| 5,319,040 A | 6/1994 | Wengrovius |
| 5,461,134 A | 10/1995 | Leir |
| 5,475,124 A | 12/1995 | Mazurek |
| 5,512,650 A | 4/1996 | Leir |
| 5,776,764 A * | 7/1998 | Ueta ............... G03F 7/0754 430/270.1 |
| 5,792,554 A | 8/1998 | Leir |
| 6,355,759 B1 | 3/2002 | Sherman |
| 6,458,454 B1 | 10/2002 | Kreckel |
| 2001/0031798 A1 | 10/2001 | Wright |
| 2011/0212325 A1 | 9/2011 | Determan |

(Continued)

FOREIGN PATENT DOCUMENTS

| | | |
|---|---|---|
| EP | 1772479 | 4/2007 |
| JP | H02-36234 | 2/1990 |
| WO | WO 00-31203 | 6/2000 |

OTHER PUBLICATIONS

"Dow Corning Q2-7406 Adhesive", Product Information Adhesives, [Retrieved from the Internet on Dec. 9, 2013], URL <http://www2.dowcorning.com/DataFiles/090007c8800032da.pdf>, 4pgs.
Clarson, Siloxane Polymers, (1993).
Encyclopedia of Polymer Science and Engineering, vol. 15, 265-270 (1989).
Encyclopedia of Polymer Science and Technology, vol. 11, 765-841.
Gizycki, Angewandte Chemie International Edition, Eng., Jun. 1971, vol. 10, No. 6, pp. 403.
Kirk-Othmer, Encyclopedia of Polymer Science and Engineering, vol. 15, 235-243 (1989).
Stark, Comprehensive Organometallic Chemistry, vol. 2, 329-330 (1982).

(Continued)

*Primary Examiner* — Sanza McClendon
(74) *Attorney, Agent, or Firm* — Kent S. Kokko

(57) ABSTRACT

A curable composition comprising a silicone, a halomethyl-1,3,5-triazine and optionally a silicate tackifier is disclosed. The compositions are useful in the preparation of pressure-sensitive adhesives and release coatings.

14 Claims, No Drawings

(56) References Cited

U.S. PATENT DOCUMENTS

2015/0252235 A1* 9/2015 Chatterjee .............. C09J 183/04
524/500

OTHER PUBLICATIONS

Tomanek, Silicones and Industry: A Compendium for Practical Use, Instruction, and Reference, Wacher-Chemie: Munich, (1993).
Wakabayashi, "Studies on s-Triazines. I. Cotrimerization of Trichloroacetonitrile with Other Nitriles", Bulletin of the Chemical Society of Japan, Oct. 1969, vol. 42, pp. 2924-2931.
International Search Report for PCT International Application No. PCT/US2013/067636, mailed on Dec. 16, 2013, 5pgs.

* cited by examiner

UV-CURABLE SILICONE RELEASE COMPOSITIONS

CROSS REFERENCE TO RELATED APPLICATIONS

This application is a national stage filing under 35 U.S.C. 371 of PCT/US2013/067636, filed Oct. 31, 2013, which claims priority to Provisional Application No. 61/723,817, filed Nov. 8, 2012, the disclosure of which is incorporated by reference in its/their entirety herein.

This disclosure relates to a curable silicone composition for preparing release layers and pressure sensitive adhesives, and to substrates bearing a layer of the cured composition. More specifically, this invention relates to a silicone composition, curable with actinic radiation.

BACKGROUND

As release coating, silicone compositions have been used to render adhesive materials nonadherent to substrates. Such silicone compositions generally comprise a mixture of an ethylenically-unsaturated organopolysiloxane, an organohydrogenpolysiloxane, and a catalyst for the curing of the mixture by means of a hydrosilation reaction.

For example U.S. Pat. No. 4,609,574 discloses a curable silicone coating composition that cures more rapidly at elevated temperatures or cures less rapidly at lower temperatures. This composition comprises (A) a polydiorganosiloxane wherein 90 to 99.5% of all organic groups are methyl and from 0.5 to 10% of all organic groups are selected from vinyl and higher alkenyl groups, (B) an effective amount of a metal hydrosilation catalyst; (C) a methylhydrogenpolysiloxane crosslinking agent compatible with (A) and having an average of at least three silicon-bonded hydrogen atoms per molecule; and (D) an effective amount of an inhibitor for the metal hydrosilation catalyst; and wherein the composition contains 0.8 to 1.5 silicon-bonded hydrogen atoms for every unsaturated group in the composition.

While silicone compositions that provide coatings having low release and fast curing characteristics are known, silicone compositions that provide release coatings which do not require catalysts are sought.

As pressure-sensitive adhesives, silicone compositions are known. They have a variety of applications because they can possess one or more of the following properties: high thermal stability; high oxidative stability; permeability to many gases; low surface energy; low index of refraction; low hydrophilicity; dielectric properties; biocompatibility; and adhesive properties. Examples of such pressure sensitive adhesives are disclosed in U.S. Pat. No. 5,461,134 (Leir et al.), U.S. Pat. No. 5,512,650 (Leir et al.), U.S. Pat. No. 5,475,124 (Mazurek et al.), U.S. Pat. No. 5,792,554 (Leir et al.), U.S. Pat. No. 6,355,759 (Sherman et al.) and U.S. Pat. No. 6,458,454 (Kreckel).

Although silicone pressure sensitive adhesives are known to adhere to a wide variety of substrates, there is still a need for adhesives and adhesive articles, particularly tapes that provide an effective peel strength and shear strength to such substrates, without the need for a catalysts or other chemical or physical surface treatment of the substrate. Further, the composition may be prepared neat or in a solvent, and applied to a substrate using a solvent or hot-melt coated.

SUMMARY

The present disclosure provides a curable silicone polymer or oligomer, and a halomethyl 1,3,5-triazine crosslinking agent. The curable compositions provide novel release coating, and when tackified, pressure-sensitive adhesives. The silicones may be non-functional or functional.

In one embodiment, the present invention provides an article that includes a substrate (or backing) and a release coating of the instant composition disposed on the substrate comprising the curable composition. Release coatings can be used in adhesive tape rolls, where the tape is wound upon itself and usage requires unwinding of the tape roll. Such release coatings are typically referred to as LABs. Release coatings can also be used as a "liner" for other adhesive articles such as labels or medical dressing bandages, where the adhesive article is generally supplied as a sheet-like construction, as opposed to a roll construction.

In another embodiment the present disclosure provides an adhesive article that includes a substrate (or a backing) and an adhesive coating disposed on the substrate comprising the tackified curable composition.

The release coatings prepared from the curable compositions of this disclosure are characterized by the "release test" and the "readhesion test" described herein.

The pressure-sensitive adhesives prepared from the curable compositions of this disclosure provide the desired balance of tack, peel adhesion, and shear holding power, and further conform to the Dahlquist criteria, i.e., the modulus of the adhesive at the application temperature, typically room temperature, is less than $3 \times 10^6$ dynes/cm at a frequency of 1 Hz.

As used herein:

"Alkyl" means a linear or branched, cyclic or acylic, saturated monovalent hydrocarbon having from one to about twelve carbon atoms, e.g., methyl, ethyl, 1-propyl, 2-propyl, pentyl, and the like.

"Alkylene" means a linear saturated divalent hydrocarbon having from one to about twelve carbon atoms or a branched saturated divalent hydrocarbon having from three to about twelve carbon atoms, e.g., methylene, ethylene, propylene, 2-methylpropylene, pentylene, hexylene, and the like.

"Alkenyl" means a linear saturated monovalent hydrocarbon having from one to about twelve carbon atoms or a branched unsaturated hydrocarbon having from three to about twelve carbon atoms.

"Aryl" means a monovalent aromatic, such as phenyl, naphthyl and the like.

"Arylene" means a polyvalent, aromatic, such as phenylene, naphthalene, and the like.

The term "hydrocarbyl" means a saturated or unsaturated linear, branched, cyclic, or polycyclic hydrocarbon group. Unless otherwise indicated, the hydrocarbyl groups typically contain up to 30 carbon atoms, often up to 20 carbon atoms, and even more often up to 10 carbon atoms. This term is used to encompass alkyl, alkenyl, alkynyl groups, as well as cyclic groups such as alicyclic and aromatic groups, for example.

DETAILED DESCRIPTION

The present disclosure provides a curable composition comprising a polysiloxane and a halomethyl-1,3,5-triazine crosslinking agent. The composition, when cured, provides useful release coatings. The disclosure further provides a curable composition comprising a polysiloxane, a halomethyl-1,3,5-triazine crosslinking agent and a tackifier, such as an MQ resin, which when cured, provides pressure-sensitive adhesive compositions. The composition requires no further catalysts or crosslinking agents.

Silicone

The silicone used in the curable composition may be any non-functional silicone, or any functional silicone that is conventionally classified as condensation curable silicones, an addition-curable (or hydrosilylation curable) silicones, a free radical-cure silicones, or a cationic-curable silicone. General references regarding curable silicone polymers include Kirk-Othmer Encyclopedia of Polymer Science and Engineering, $2^{nd}$ edition, Wiley-Interscience Pub., 1989, volume 15, pp. 235-243; Comprehensive Organometallic Chemistry, Ed. Geoffrey Wilkinson, Vol. 2, Chapter 9.3, F. O. Stark, J. R. Falender, A. P. Wright, pp. 329-330, Pergamon Press: New York, 1982; Silicones and Industry: A Compendium for Practical Use, Instruction, and Reference, A. Tomanek, Carl Hanser: Wacher-Chemie: Munich, 1993; Siloxane Polymers, S. J. Clarson, Prentice Hall: Englewood Cliffs, N.J., 1993; and Chemistry and Technology of Silicones, W. Noll, Verlag Chemie: Weinheim, 1960.

The silicone materials useful in the present disclosure are poly diorganosiloxanes, i.e., materials comprising a polysiloxane backbone. In some embodiments, the nonfunctionalized silicone materials can be a linear or branched material of the formula:

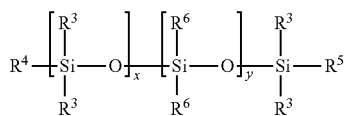

wherein
$R^3$ is each independently an alkyl, aryl or alkoxy group;
$R^4$ is H, an alkyl, aryl, alkoxy group, or a functional group including epoxy, amine, hydroxy groups, or —Si($R^3$)$_2R^5$;
$R^5$ is H, an alkyl, aryl, alkoxy group, or a functional group including epoxy, amine, hydroxy groups, or —Si($R^3$)$_2R^5$;
$R^6$ is H, an alkyl, aryl, alkoxy group, or a functional group including epoxy, amine, hydroxy groups, or —Si($R^3$)$_2R^5$;
y is 0 to 20; preferably 1-75; and
x is at least 10.

In some embodiments, $R^4$ and $R^5$ is a methyl group, i.e., the nonfunctionalized poly diorganosiloxane material is terminated by trimethylsiloxy groups. In some embodiments, $R^3$ are alkyl groups and y is zero, i.e., the material is a poly(dialkylsiloxane). In some embodiments, the alkyl group is a methyl group, i.e., poly(dimethylsiloxane) ("PDMS"). In some embodiments, one $R^3$ is an alkyl group, and another geminal $R^3$ is an aryl group, and y is zero, i.e., the material is a poly(alkylarylsiloxane), such as poly(methylphenylsiloxane). In some embodiments, $R^3$ are alkyl groups and $R^6$ are aryl groups, i.e., the material is a poly (dialkyldiarylsiloxane), such as poly(dimethyldiphenylsiloxane). The nonfunctionalized poly diorganosiloxane materials may be branched. For example, one or more of the $R^3$ and/or $R^6$ groups may be a linear or branched siloxane with alkyl or aryl substituents and terminal $R^4$ and $R^5$ groups.

As used herein, "nonfunctional groups" are either alkyl, alkoxy or aryl groups consisting of carbon, hydrogen. As used herein, a "nonfunctionalized poly diorganosiloxane material" is one in which the $R^3$, $R^4$, $R^5$ and $R^6$ groups are nonfunctional groups.

Functional silicone systems include specific reactive groups attached to the polysiloxane backbone of the starting material (for example, hydride, amino, epoxy or hydroxyl groups). As used herein, a "functionalized poly diorganosiloxane material" is one in which at least one of the $R^7$-groups of Formula 2 is a functional group.

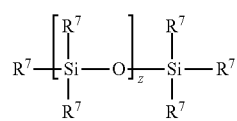

wherein
each $R^7$ is independently an alkyl, alkoxy, aryl, or functional groups, with the proviso that at least one $R^7$ group is a functional group, and z is at least 10.

In some embodiments, a functional poly diorganosiloxane material in which at least 2 of the functional $R^7$ groups are functional groups. Generally, the $R^7$ groups of Formula II may be independently selected from the group consisting of a hydride group, an amine group, a hydroxy group, and an epoxy group. In addition to functional $R^7$ groups, the remaining $R^7$ groups may be nonfunctional groups, e.g., alkyl or aryl groups. In some embodiments, the functionalized poly diorganosiloxane materials may be branched. For example, one or more of the $R^7$ groups may be a linear or branched siloxane with functional and/or non-functional substituents.

In some particularly preferred embodiments, the silicone is a functional silicone, wherein at least one of said $R^4$ and $R^5$ groups of Formula I, or at least one of said $R^7$ groups of Formula II, are epoxy, —OH or —NH$_2$, e.g. epoxy, hydroxy or amine terminated silicones. In particular, poly(dimethylsiloxanes) having hydroxy or amino groups at one or both termini are contemplated:

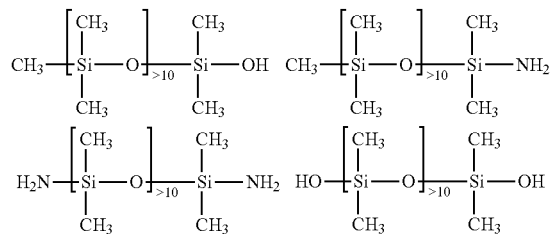

Generally, the silicone materials may be oils, fluids, gums, elastomers, or resins, e.g., friable solid resins. Generally, lower molecular weight, lower viscosity materials are referred to as fluids or oils, while higher molecular weight, higher viscosity materials are referred to as gums; however, there is no sharp distinction between these terms. Elastomers and resins have even higher molecular weights than gums, and typically do not flow. As used herein, the terms "fluid" and "oil" refer to materials having a dynamic viscosity at 25 degrees centigrade of no greater than 1×10$^6$ cSt (e.g., less than 6×10$^5$ cSt), while materials having a dynamic viscosity at 25 degrees centigrade of greater than 1×10$^6$ cSt (e.g., at least 1×10$^7$ cSt) are referred to as "gums". Silicones are generally described in terms of the kinematic viscosity rather than molecular weight or the number of repeat units.

When used in curable compositions to prepare release coating, the preferred silicones have a kinematic viscosity of 1×10⁶ to 20×10⁶ centistokes. When used in curable compositions to prepare pressure-sensitive adhesives, the preferred silicones have a kinematic viscosity of 30,000 to 20×10⁶ centistokes.

The halomethyl-1,3,5-triazine crosslinking agents are found to be highly efficient and reliable UV crosslinkers. They are oxygen tolerant, have scavenging ability, and have been found to cure the instant compositions under low intensity light irradiation. Surprisingly, the cured compositions are stable when exposed to high heat and/or humidity for extended periods. Silicones are known to degrade on exposure to acids, which are a by-product of the crosslinking mechanism with halomethyl-1,3,5-triazines.

Without being bound by theory, it is believed that the halomethyl triazine crosslinking agent functions by hydrogen abstraction of the silicone followed by radical-radical coupling. More particularly, a hydrogen alpha to the silicone atom may be abstracted to form a radical, which may couple with another such radical. Alternatively, the halomethyl-1,3,5-triazine per se may function as a crosslinking agent, whereby a halomethyl radical is generated, which may abstract a proton from the silicone, or couple with a radical on the silicone. The result may be a crosslinked silicone of the general structure:

Silicone —CX₂-Triazine-CX₂-Silicone, where X is halogen as described below.

The halomethyl-1,3,5-triazine is of the general formula:

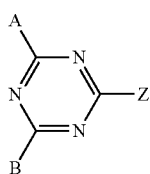

III wherein
A is a mono-, di-, or trihalomethyl, preferably trichloromethyl
B is A, —N(R¹)₂, OR¹, R¹, L-R$^{sensitizer}$ or L-R$^{PI}$, where R¹ is H, or preferably alkyl or aryl;
Z is a conjugated chromophore, L-R$^{sensitizer}$ or -L-R$^{PI}$,
L is a covalent bond or a (hetero)hydrocarbyl linking group. Preferably, A and B are trihalomethyl, more preferably trichloromethyl.

In one embodiment, the halomethyl-1,3,5-triazine is as described in U.S. Pat. No. 4,330,590 (Vesley), and is of the formula:

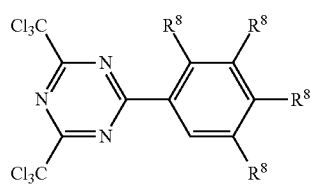

wherein: each R⁸ is independently hydrogen, alkyl, or alkoxy; and 1-3 of the R⁸ groups are hydrogen. Preferably, the alkyl and alkoxy groups have no more than 12 carbon atoms, and often no more than 4 carbon atoms. Preferably, one or two of the meta- and/or para-R⁸ groups are alkoxy, because this tends to provide shorter reaction times. Adjacent alkoxy substituents may be interconnected to form a ring. The triazine component may be prepared by the co-trimerization of an aryl nitrile with trichloroacetonitrile in the presence of HCl gas and a Lewis acid such as AlCl₃, AlBr₃, etc., as described in *Bull. Chem. Soc. Japan*, Vol. 42, page 2924 (1969).

In another embodiment, the halomethyl-1,3,5-triazine is as described in U.S. Pat. No. 4,329,384 (Vesley), and is of the formula:

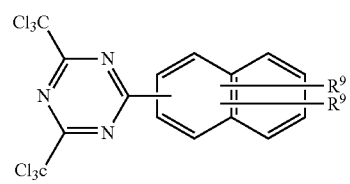

wherein each R⁹ is independently hydrogen, alkyl, or alkoxy. By this representation, it is meant that R⁹ groups can be on either of the fused rings. Preferably, any alkyl or alkoxy group of the photoactive s-triazine component has no more than 12 carbon atoms, and no more than two alkyl and alkoxy groups have more than 6 carbon atoms. In certain embodiments, they have no more than 4 carbon atoms, and the alkyl is often methyl or ethyl, and the alkoxy is often methoxy or ethoxy. Adjacent alkoxy substituents may be interconnected to form a ring. The halomethyl triazine component may be prepared by the co-trimerization of a polynuclear nitrile with trichloroacetonitrile in the presence of HCl gas and a Lewis acid such as AlCl₃, AlBr₃, etc. as described in *Bull. Chem. Soc. Jap.*, Vol. 42, pages 2924-2930 (1969).

Examples of suitable halomethyl-1,3,5-triazines agents include, but are not limited to, 2,4-bis(trichloromethyl)-6-(4-methoxy)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s-triazine; 2,4-bis(trichloromethyl)-6-(2,4-dimethoxy)phenyl)-s-triazine; 2,4-bis(trichloromethyl)-6-(3-methoxy)phenyl)-s-triazine as described in U.S. Pat. No. 4,330,590 (Vesley), and 2,4-bis(trichloromethyl)-6-naphthenyl-s-triazine and 2,4-bis(trichloromethyl)-6-(4-methoxy)naphthenyl-s-triazine as described in U.S. Pat. No. 4,329,384 (Vesley).

In some embodiments the halomethyl-1,3,5-triazine further comprises a photosensistizer group as illustrated in the following formula. Photosensitizers incorporated into the halomethyl-1,3,5-triazines broaden their natural range of sensitivity.

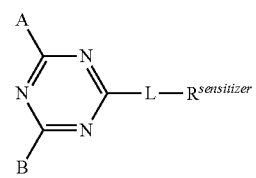

Wherein
A is a mono-, di-, or trihalomethyl,
B is A, —N(R¹)₂, —OR¹, R¹, L-R$^{sensitizer}$ or -L-R$^{PI}$, where R¹ is H, or preferably alkyl or aryl;
L is a covalent bond or a (hetero)hydrocarbyl linking group, and
R$^{sensitizer}$ is a sensitizer moiety not being part of the triazine chromophore and being capable of absorbing actinic radiation, preferably said sensitizer moiety having a lambda max of at least 330 nm, and L represents a hetero)hydrocarbyl group linking the sensitizer moiety to the triazine nucleus, provided that the chromophore of said triazine nucleus is not attached to the chromophore of said sensitizer moiety either directly by a covalent bond or by a conjugated linkage.

The sensitizer group has a lambda max of at least 330 nm, preferably 350 nm up to 900 nm. The presence of the sensitizer moiety gives the compounds of this invention greater spectral sensitivity than halomethyl-1,3,5-triazine compounds not having such a sensitizer moiety. The sensitizer group may be represented by cyanine groups, carbocyanine groups, merocyanine groups, aromatic carbonyl groups, styryl groups, acridine groups, polycyclic aromatic hydrocarbyl groups, polyarylamine groups, amino-substituted chalcone group, and other known to the art. The natural sensitivity of halomethyl-1,3,5-triazines to actinic radiation is well known. Simple derivatives, such as 2-methyl-4,6-bis-trichloromethyl-1,3,5-triazine, absorb actinic radiation in the lower ultraviolet region, e.g. below 300 nm.

More particularly, L represents a (hetero)hydrocarbyl group that links the sensitizer moiety or moieties to the triazine nucleus. The precise identity of L is not critical, but it should be selected so that it does not interfere with or adversely affect the light sensitivity of the compound. Furthermore, L should be chosen so that it does not connect the chromophore of the halomethyl-1,3,5-triazine nucleus and the chromophore of the sensitizer moiety either directly by a covalent bond or by a conjugated linkage. However, any through space intramolecular complexation between the chromophores is not precluded. L can be a single group or can be formed from a combination of groups. Groups that are suitable for linking groups include carbamator ($-NHCO_2-$), urea ($-NHCONH-$), amino ($-NH-$), amido ($-CONH_2-$), aliphatic e.g., having up to 10 carbon atoms, alkyl, e.g., having up to 10 carbon atoms, alkenyl, e.g., having up to 10 carbon atoms, aryl, e.g., having one ring, styryl, ester ($-CO_2-$), ether ($-O-$), and combinations thereof. Based on ease of synthesis, the most preferred groups for attachment directly to the triazine nucleus are carbamato, urea, amino, alkenyl, aryl, and ether. Whenever the group directly attached to the triazine nucleus is either alkenyl group or aryl group, another group must be interposed between the alkenyl group or aryl group and the sensitizer moiety to prevent the sensitizer moiety from forming a conjugate bond with the triazine nucleus.

The following structures exemplify useful $-L-R^{sensitizer}$ groups:

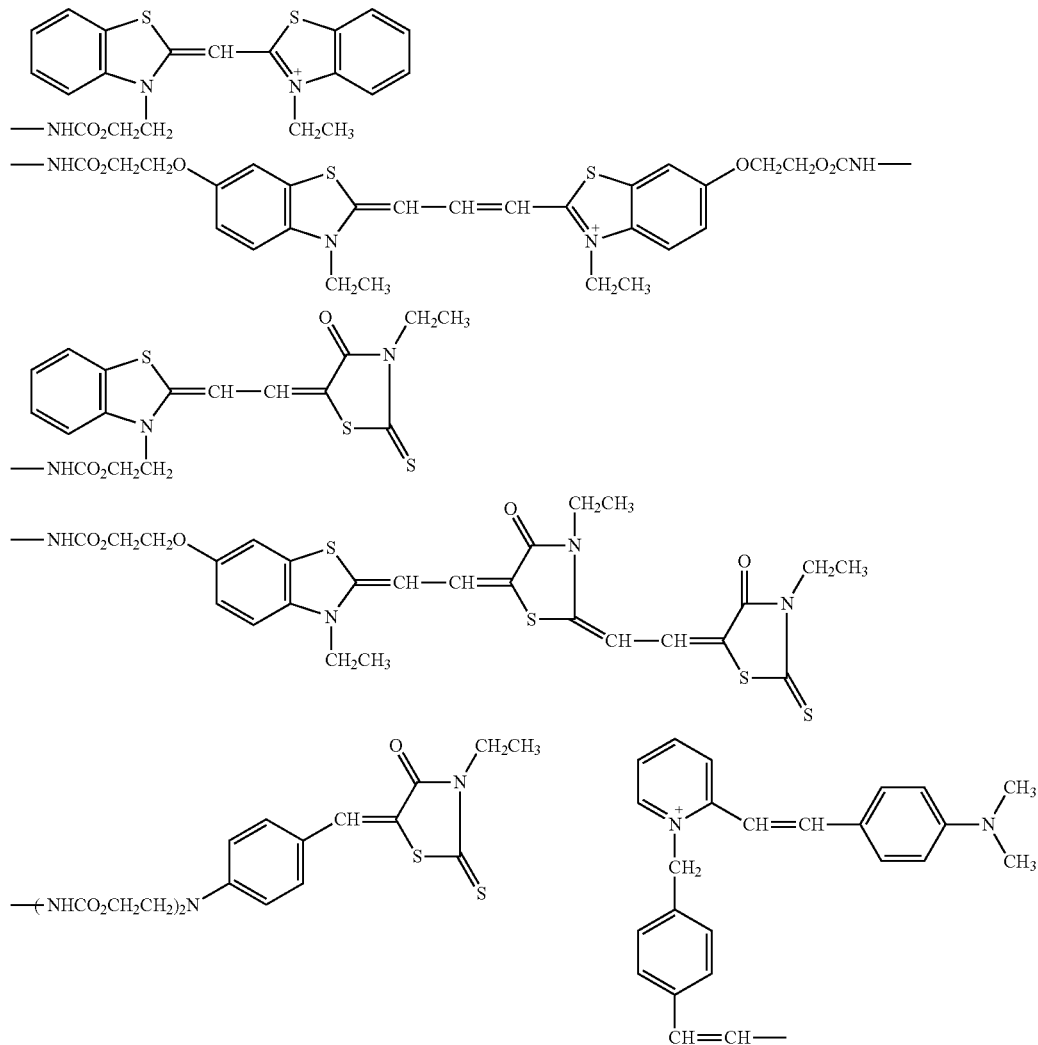

-continued

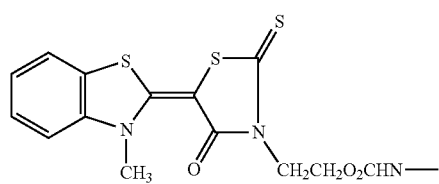
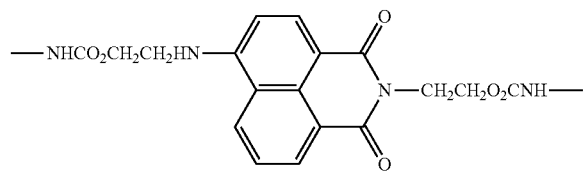
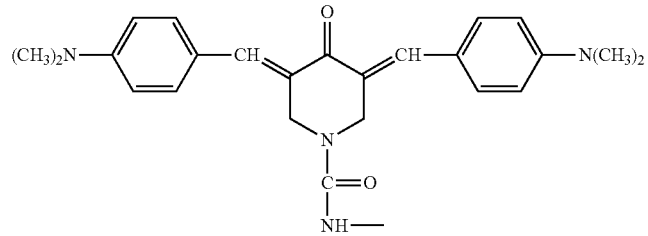
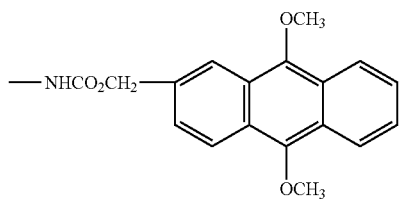
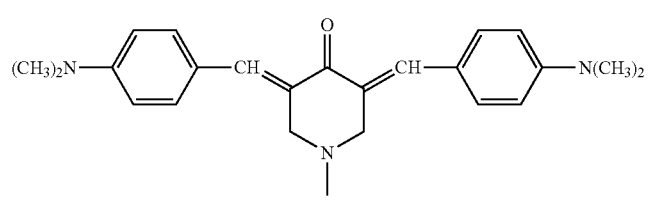
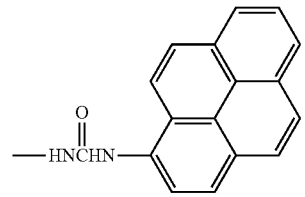
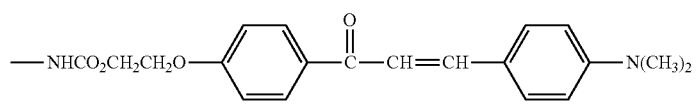
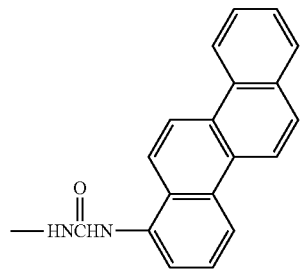

One method of preparing the compounds of this invention is by the addition reaction of isocyanato-substituted halomethyl-1,3,5-triazines with sensitizers having groups reactive with the isocyanate group. The isocyanato substituted triazines may be prepared from the corresponding amino derivative according to the procedure of U. Von Gizycki, Angew, Chem. Int. Ed. Eng., 1971, 10, 403. Isocyanato-1,3,5-triazines suitable for this reaction include: 2,4-bis(trichloromethyl)-6-isocyanato-1,3,5-triazine, 2-isocyanato-4-methyl-6-trichloromethyl-1,3,5-triazine, 2-isocyanato-4-phenyl-6-trichloromethyl-1-3,5-triazine, 2-isocyanato-4-methoxy-6-trichloromethyl-1,3,5-triazine, 2-isocyanato-4-(p-methoxyphenyl)-6-trichloromethyl-1,3,5-triazine, 2-isocyanato-4-(p-methoxystyryl)-6-trichloromethyl-1,3,5-triazine, 2-isocyanato-4-(m,p,-dimethoxyphenyl)-6-trichloromethyl-1,3,5-triazine and 2,4,6-tris(isocyanato)-1-3,5-triazine Examples of sensitizers that will combine with the isocyanato group include 4-(2'-hydroxyethyl)amino-N-2"-hydroxyethyl)-1,8-naphthalimide, 3,5-bis(dimethylaminobenzal)-4-piperidone, hydroxyethylrhodanine-N"-methylbenzothiazole, 1-aminopyrene, and 6-aminochrysene.

Another method of preparing the compounds of this invention is the co-trimerization of organic nitriles having a sensitizer substituent with haloacetonitriles in accordance with the teachings of Wakabayashi et al, Bulletin of the Chemical Society of Japan, 1969, 42, 2924-30; still another method of preparing the compounds of this invention is the condensation reaction of an aldehyde compound having a photoinitiator functionality in accordance with the teachings of U.S. Pat. No. 3,987,037 (Bonham et al.), incorporated herein by reference. Still another method of preparing the compound of this invention is the nucleophilic displacement reactions on halomethyl-1,3,5-triazines using sensitizers having free hydroxy or amino groups. Further reference to halomethyl-1,3,5-triazines having sensitizer groups may be found in U.S. Pat. No. 5,187,045 (Bonham et al.) incorporated herein by reference.

In some embodiments the halomethyl-1,3,5-triazine further comprises a photoinitiator group —$R^{PI}$ as in the formula:

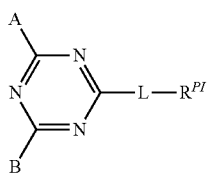

Wherein
A is a mono-, di-, or trihalomethyl,
B is A, —N(R$^1$)$_2$, —OR$^1$, R$^1$, or -L-R$^{PI}$, where R$^1$ is H, or preferably alkyl or aryl;
L is a covalent bond or a (hetero)hydrocarbyl linking group, and
R$^{PI}$ is a photoinitiator moiety that is capable of initiating free radical or ionic chain polymerization upon exposure to actinic radiation, and, and L represents a (heterohydocarbyl linking group.

R$^{PI}$ preferably represents at least one group selected from the group consisting of benzoin group, dialkoxyacetophenone group, benzophenone group, anthraquinone group, thioxanthone group, triarylsulfonium group, diaryliodonium group, a-acyloxime group, azide group, diazonium group, 3-ketocoumarin group, bisimidazole group, fluorenone group, or a halomethyl-1,3,5-triazine group covalently bonded to the triazine nucleus of formula I.

L represents a group that links the photoinitiator moiety or moieties to the triazine nucleus. The precise identity of L is not critical, but it should be selected so that it does not interfere with or adversely affect the photoination characteristics or light sensitivity of the compound. L can be formed from a single group or it can be formed from a combination of groups. In addition, L also includes a covalent bond. Groups that are suitable for linking groups include carbamato (—NHCO$_2$—), urea (—NHCONH—), amino (—NH—), amido (—CONH—), aliphatic, e.g., having up to 10 carbon atoms, alkylene, e.g., having up to 10 carbon atoms, haloalkylene, e.g., having up to 10 carbon atoms, alkenyl, e.g., having up to 10 carbon atoms, aryl, e.g., having one ring, styryl, ester (—CO$_2$—), ether (—O—), and combinations thereof. Based on ease of synthesis, the most preferred groups for attachment directly to the triazine nucleus are carbamato, urea, amino, alkenyl, aryl, and ether. When L represents an alkenyl group, i.e., CH=CH$_n$, it is required that the triazine moiety not be ethylenically conjugated with the photoinitiator moiety. Other types of conjugation, e.g., aromatic, carbonyl, are not intended to be excluded by the foregoing requirement.

The following illustrates typical -L-R$^{PI}$ groups:

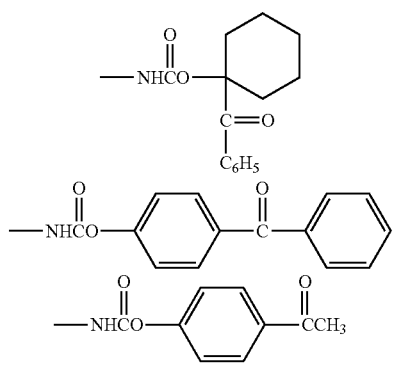

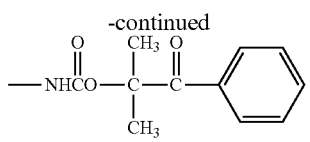

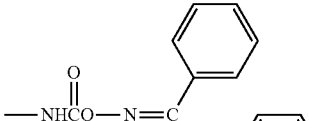

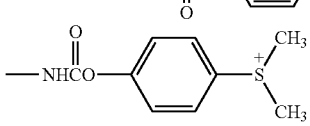

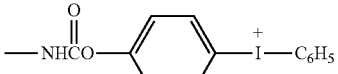

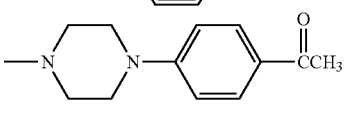

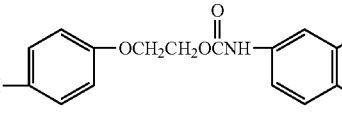

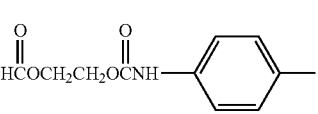

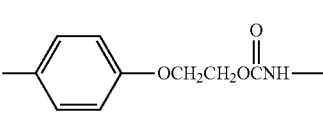

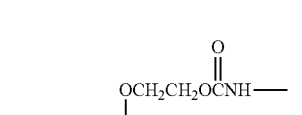

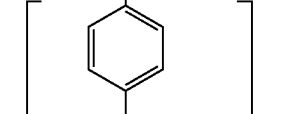

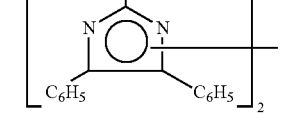

One method of preparing the compounds of this invention is by the addition reaction of isocyanato-substituted halomethyl-1,3,5-triazines with photoinitiators having groups reactive with the isocyanate group, as taught for the sensitizer-substituted triazines supra. Typical photoinitiators that will combine with the isocyanato group include 1-benzoyl cyclohexanol (Irgacure 184), 4-hydroxyacetophenone, 4-hydroxybenzophenone, 4-aminobenzophenone, 2-amino-9-fluorenone, 2-aminoanthraquinone, 2-hydroxymethylanthraquinone, 4'-piperidinoacetophenone, 4-hydroxydiphenyliodonium salt, dimethyl-4-hydroxyphenylsulfonium salt, and 2,4-bis(trichloromethyl)-6-hydroxyethylamino-1,3,5-triazine.

Further reference to halomethyl-1,3,5-triazines having photoinitiator groups may be found in U.S. Pat. No. 5,153,323 (Rossman et al.) incorporated herein by reference.

This disclosure provides curable composition, which when cured by the halomethyl-1,3,5-triazine, provide low surface energy release coatings. Useful release coatings have a Release Test Value of less than 200 g/in, preferably less than 100 g/in, per the specified release test method. In particular, release coating may be prepared from a) 95 to 99.9 parts by weight silicone, and
b) 0.1 to 5 parts by weight halomethyl-1,3,5-triazine crosslinking agent, the sum being 100 parts by weight. In certain preferred embodiments, the silicone has a dynamic viscosity of $1 \times 10^6$ to $20 \times 10^6$ centistokes and the composition comprises. 98 to 99.5 parts by weight of silicone, and 2 to 0.5 parts by weight of crosslinking agent, the sum being 100 parts by weight.

The present disclosure further provides pressure sensitive adhesive composition that comprises the cured reaction product of a polysiloxane, a halomethyl-1,3,5-triazine and a silicate tackifier resin, known as "MQ resins".

MQ silicate resins useful in the present adhesive composition include those composed of the structural units M, D, T, Q, and combinations thereof. For example, MQ silicate resins, MQD silicate resins, and MQT silicate resins that also may be referred to as copolymeric silicate resins and that preferably have a number average molecular weight of about 100 to about 50,000, more preferably about 500 to about 10,000 and generally have methyl substituents. Silicate resins include both nonfunctional and functional resins, the functional resins having one or more functionalities including, for example, silicon-bonded hydrogen, silicon-bonded alkenyl, and silanol.

MQ silicone resins are copolymeric silicone resins having $R^3_3SiO_{1/2}$ units (M units) and $SiO_{4/2}$ units (Q units), where $R^3$ is an alkyl or aryl group, and most frequently a methyl group.

Such resins are described in, for example, Encyclopedia of Polymer Science and Engineering, vol. 15, John Wiley & Sons, N.Y., 1989, pp. 265 to 270, and U.S. Pat. No. 2,676,182 (Daudt et al.); U.S. Pat. No. 3,627,851 (Brady); U.S. Pat. No. 3,772,247 (Flannigan); and U.S. Pat. No. 5,248,739 (Schmidt et al.), the disclosures of which patents are incorporated herein by reference. MQ silicone resins having functional groups are described in U.S. Pat. No. 4,774,310 (Butler), which describes silyl hydride groups, U.S. Pat. No. 5,262,558 (Kobayashi et al.), which describes vinyl and trifluoropropyl groups, and U.S. Pat. No. 4,707,531 (Shirahata), which describes silyl hydride and vinyl groups, the disclosures of which are incorporated herein. The above-described resins are generally prepared in solvent. Dried or solventless MQ silicone resins are prepared as described in U.S. Pat. No. 5,319,040 (Wengrovius et al.); U.S. Pat. No. 5,302,685 (Tsumura et al.); and U.S. Pat. No. 4,935,484 (Wolfgruber et al.); the disclosures of which are incorporated herein by reference.

MQD silicone resins are terpolymers having $R^3_3SiO_{1/2}$ units (M units) and $SiO_{4/2}$ units (Q units) and $R^3_2SiO_{2/2}$ units (D units) as described, e.g., in U.S. Pat. No. 5,110,890 (Butler), the disclosure of which is incorporated herein by reference and Japanese Kokai HE 2-36234.

MQT silicone resins are terpolymers having $R^3_3SiO_{1/2}$ units (M units), $SiO_{4/2}$ units (Q units), and $R^3SiO_{3/2}$ units (T units) such as are taught in U.S. Pat. No. 5,110,890, incorporated herein by reference.

Commercially available silicate resins include SR-545, MQ resin in toluene, available from Momentive Inc., Columbus, Ohio; MQOH resins which are MQ silicate resins in toluene, available from PCR Inc., Gainesville, Fla.; MQR-32-1, MQR-32-2, and MQR-32-3 resins which are MQD resin in toluene, available from Shin-Etsu Chemical Co. Ltd., Torrance, Calif.; and PC-403, hydride functional MQ resin in toluene available from Rhone-Poulenc, Latex and Specialty Polymers, Rock Hill, S.C. Such resins are generally supplied in organic solvent and may be employed in compositions of the present invention as received. However, these organic solutions of silicate resin may also be dried by any number of techniques known in the art, such as spray drying, oven drying, steam drying, etc. to provide a silicate resin at about 100% nonvolatile content for use in compositions of the present invention. Also useful in compositions of the present invention are blends of two or more silicate resins.

In adhesive compositions, the MQ tackifying resin is typically present in the pressure sensitive adhesive composition in an amount sufficient to impart a degree of adhesive tack to the cured composition at the use temperature.

This disclosure provides pressure-sensitive adhesive composition comprising the silicone, the halomethyl-1,3,5-triazine, and the silicate tackifier. More particularly the adhesive comprises the cured reaction product of:
a) 30 to 100 parts by weight silicone
b) 15 to 65 parts by weight silicate tackifier
c) 0.1 to 5 parts by weight halomethyl-1,3,5-triazine crosslinking agent.

The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz.

The composition comprising the silicone, the halomethyl-1,3,5-triazine and optionally the MQ tackifier may be irradiated with activating UV radiation to crosslink the silicone component(s). UV light sources can be of two types: 1) relatively low light intensity sources such as Blacklights which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm$^2$, preferably 15 to 450 mW/cm$^2$. Where actinic radiation is used to fully or partially polymerize the syrup composition, high intensities and short exposure times are preferred. For example, an intensity of 600 mW/cm$^2$ and an exposure time of about 1 second may be used successfully. Intensities can range from 0.1 to 150 mW/cm$^2$, preferably from 0.5 to 100 mW/cm$^2$, and more preferably from 0.5 to 50 mW/cm$^2$. Such photoinitiators preferably are present in an amount of from 0.1 to 1.0 part by weight, relative to 100 parts by weight of the total monomer content that would form an unmodified acid-functional (meth)acrylic copolymer.

The crosslinking or curing of the composition may be conducted in the presence of, or preferably in the absence of, suitable solvents such as ethyl acetate, toluene and tetrahydrofuran, which are unreactive with the functional groups of the components of the syrup composition.

It is preferable to coat the composition prior to crosslinking. The composition, either neat or solution, are easily coated upon suitable substrates, such as flexible backing materials, by conventional coating techniques, then further polymerized, and cured, to produce adhesive coated sheet materials. The flexible backing material may be any material conventionally utilized as a tape backing, optical film, or any other flexible material.

The above-described compositions can be coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary. The solutions may be of any desirable concentration, and for subsequent coating, but is typically 20 to 70 weight percent (wt-%) polymer solids, and more typically 30 to 50 wt-% solids, in solvent. In some embodiments the compositons may be coated neat. The desired concentration may be achieved by further dilution of the coating composition, or by partial drying.

Adhesive articles and release articles may be prepared by coating the composition on a suitable support, such as a flexible backing. Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the disclosure include HOSTAPHAN 3SAB, primed polyester film (available from Mitsubishi Polyester Film Inc., Greer, S.C.), kraft paper (available from Monadnock Paper, Inc.); cellophane (available from Flexel Corp.); spun-bond poly(ethylene) and poly(propylene), such as TYVEK and TYPAR (available from DuPont, Inc.); and porous films obtained from poly(ethylene) and poly(propylene), such as TESLIN (available from PPG Industries, Inc.), and CELLGUARD (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure-sensitive adhesive compositions such as labels, tapes, signs, covers, marking indicia, and the like.

EXAMPLES

As used herein, all weights, parts, and percentages are by weight unless otherwise specified. The designation "pph" means parts per 100 hundred of polymer, e.g. polydimethylsiloxane.

Materials
 PDMS—SS4191A silicone gum solution provided as 30% solids solution in naptha; Momentive Performance Materials; Waterford, N.Y.
 Triazine—2,4-bis-trichloromethyl-6(4-methoxy-phenyl)-5-triazine
 Heptane—EMD Chemicals Inc., Gibbstown, N.J.
 MEK—methyl ethyl ketone; JT Baker; Phillipsburg, N.J.
 MIBK—methyl isobutyl ketone, Alfa Aesar; Ward Hill, Mass.
 PET film—Hostaphan® 2364 polyester film, 0.1 mm thick, corona treated on one side; Mitsubishi Polyester Film, Inc.; Greer, S.C.
 Phitoinitiator1—Irgacure 1173 (Darocur 1173)—2-Hydroxy-2-methyl-1-phenyl-1-propanone, BASF; Basel, Switzerland
 Photoinitiator2—Darocur 4265—MAPO/alpha-Hydroxyketone, BASF; Basel, Switzerland Test Methods
Release Test
 The release test is a measure of how easily a pressure sensitive adhesive tape can be peeled from a release liner. A commercially available adhesive tape (3M Industrial Packaging Tape, Scotch 373, 3M Company; St. Paul, Minn.) was to measure release properties. The pressure sensitive adhesive on the tape is a rubber resin adhesive. Test samples were prepared by cutting the tape into 1 inch by 6 inch (2.54 cm by 15.24 cm) strips and carefully attaching them to release liners, taking care to avoid trapping air bubbles, A 4.5 lb (2 kg) roller was rolled over each test sample two times at a speed of 61 cm/minute (24 inches/min). One set of test samples was conditioned for 8 days in an oven set at 70° C., and a second set of test samples was conditioned for 8 days at CTH (constant temperature (25° C.) and constant humidity (50% relative humidity)). The conditioned adhesive tape was then peeled from the liner at an angle of 180° at a peel rate of 230 em/minute (90 inches/min) using a peel tester (IMass model SP2000 peel tester, IMASS, Inc.; Accord, Mass. Release values are reported in grams per inch width (g/in). Each value is the average result of three samples tested.

Re-Adhesion Test
 The re-adhesion test measures the adhesion value of a pressure sensitive adhesive tape to a glass substrate after the adhesive had been conditioned in contact with a release liner. Test samples were prepared and conditioned as described above for the Release Test.

A glass panel was cleaned by applying heptanes on the panel and wiping with a KIM WIPE tissue, repeating two more times, and then dried. A conditioned adhesive tape strip was removed from the liner and attached to the cleaned glass panel. A 4.5 lb roller was rolled over the strip two times at a speed of 61 cm/min (24 inches/min). The tape was pulled from the glass panel at an angle of 180° and a peel rate of 30.5 cm/min (12 inches/minute) using a peel tester (Mass model SP2000 peel tester). A strip of the adhesive tape was also tested on the glass panel without conditioned to provide an initial adhesion value for comparison. Values are reported in grams/inch (g/in) and each value is the average result of three samples tested.

Silicone Coating Weight
 The amount of silicone coated onto a film was determined with an EDXRF spectrophotometer (OXFORD LAB X3000, Oxford Instruments; Elk Grove Village, Ill.). The amount of silicon was measured on 3.69 cm diameter samples of an uncoated film, and of the film coated with silicone, and compared. Values were used to determine the coating weight of the silicone.

Silicone Extractables
 Unreacted silicone was measured on a thin film of cured silicone to determine the extent of crosslinking of the silicone polymer. The coating weight of silicone on a PET film was determined as described above. After determining the coating weight of silicone on a 3.69 cm diameter disk, the coated disk was immersed in methyl isobutyl ketone (MIBK) and shaken for on a mechanical shaker (VWR Advanced Digital Shaker, VWR International; Batvia Ill.) for 5 minutes, removed, and allowed to dry. The silicone coating weight was measured again and the extractable. i.e., unreacted, silicone was determined according to the following equation:

$$\text{Weight percent extractable silicone} = ((a-b)/a) \times 100$$

wherein a is the initial coating weight before extraction with MIBK and b is the final coating weight after extraction with MIBK.

Examples 1-4

For each example, 100 grams of a solution was prepared by diluting PDMS in a solvent mixture of 50 parts heptane, and 50 parts MEK to provide 10 weight % solids (PDMS polymer) in a glass jar. Triazine was added in the amounts shown in Table 1 to each solution. The amounts of triazine are in parts per 100 parts of PDMS polymer (pph). Each jar was capped and mixed on a roller mixer for 2-3 hours.

Release liners were prepared by coating a thin layer of each solution on a PET film using a number 8 Meyer rod. The coated films were dried in a convection oven at 70° C. for 10 minutes and then cooled to room temperature. The coatings were exposed to 600 mJ/cm² of ultraviolet radiation (UV-B) in a UV processor (Fusion UV System, Inc., Gaithersburg, Md.).

The coating weights and percent extractables were determined for each release liner, and then tested for Release and Re-adhesion after aging according to the above test procedures. Results are shown in Table 1.

TABLE 1

| | Composition | | Release (g/in) | | Re-Adhesion (oz/in) | | | Coating Weight | Extractables |
|---|---|---|---|---|---|---|---|---|---|
| | PDMS | Triazine | | | | | | | |
| Ex | (parts) | (pph) | CTH | 70° C. | Init | CTH | 70° C. | (gsm) | % |
| 1 | 100 | 0.5 | 8 | 15 | 39.1 | 30.3 | 31.4 | 1.036 | 19.9 |
| 2 | 100 | 1 | 21 | 34 | 39.1 | 35.5 | 36.3 | 0.988 | 6.4 |
| 3 | 100 | 1.5 | 30 | 56 | 39.1 | 35.1 | 38.3 | 1.131 | 6.3 |
| 4 | 100 | 2 | 24 | 46 | 39.1 | 38.3 | 36.4 | 1.071 | 5.9 |

Comparative Example C1

A release liner was prepared as described in Example 1 except that 2.0 pph of Photoinitiator1 was added instead of triazine. After UV curing, the coating was not cured and could be removed by rubbing a finger over the coating on the film.

Comparative Example 2

A release liner was prepared as described in Example 1 except that 2.0 pph of Photoinitiator2 was added instead of triazine. After UV curing the coating was not cured and could be removed by rubbing a finger over the coating on the film.

This disclosure provides the following illustrative embodiments:

1. A radiation curable composition comprising a silicone polymer and a halomethyl-1,3,5-triazine.
2. The radiation curable composition of embodiment 1 wherein the halomethyl-1,3,5-triazine is of the formula:

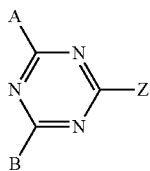

Wherein
A is a mono-, di-, or trihalomethyl,
B is A, —N(R¹)₂, —OR¹, R¹, L-R$^{sensitizer}$ or -L-R$^{PI}$, where R¹ is H, alkyl or aryl;
Z is a conjugated chromophore, L-R$^{sensitizer}$ or -L-R$^{PI}$,
L is a covalent bond or a (hetero)hydrocarbyl linking group.
3. The radiation curable composition of embodiment 2 wherein A and B are trichloromethyl.
4. The radiation curable composition of embodiment 2 wherein Z is an aryl group.
5. The radiation curable composition of embodiment 4 wherein Z is

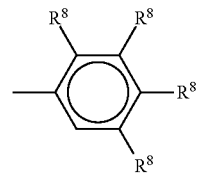

wherein
each R⁸ is independently H, alkyl, or alkoxy and 1-3 of said R⁸ groups are H.
6. The radiation curable composition of embodiment 4 wherein Z is

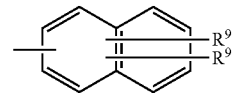

where each R⁹ is independently H, alkyl, or alkoxy.
7. The radiation curable composition of embodiment 2 wherein Z is L-R$^{sensitizer}$, wherein
L represents a (hetero)hydrocarbyl group linking the sensitizer moiety to the triazine nucleus, provided that the chromophore of said triazine nucleus is not attached to the chromophore of said R$^{sensitizer}$ sensitizer moeity either directly by a covalent bond or by a conjugated linkage;
R$^{sensitizer}$ represents a cyanine group, a carbocyanine group, a styryl group, an acridine group, a polycyclic aromatic hydrocarbon group, a polyarylamine group, or an amino-substituted chalcone group.
8. The radiation curable composition of embodiments 1 or 2 wherein Z is L-R$^{PI}$, wherein
L represents a (hetero)hydrocarbyl group linking the sensitizer moiety to the triazine nucleus,
R$^{PI}$ represents a hydrogen-abstraction type photoinitiator group.
9. The radiation curable composition of any of the previous embodiments wherein the silicone is of the formula:

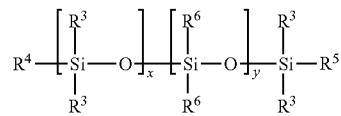

wherein
R³ is each independently an alkyl, aryl or alkoxy group;
R⁴ is H, an alkyl, aryl, alkoxy group, or a functional group including epoxy, amine, hydroxy groups, or —Si(R³)₂R⁵;
R⁵ is H, an alkyl, aryl, alkoxy group, or a functional group including epoxy, amine, hydroxy groups, or —Si(R³)₂R⁵;
R⁶ is H, an alkyl, aryl, alkoxy group, or a functional group including epoxy, amine, hydroxy groups, or —Si(R³)₂R⁵;
y is 0 to 20; preferably 1-75; and
x is at least 10.

10. The radiation curable composition of any of the previous embodiments wherein the silicone is a poly(dialkylsiloxane).

11. The radiation curable composition of claim 1 wherein the silicone is a hydroxy-terminated poly(dialkylsiloxane).

12. The radiation curable composition of any of embodiments 1-10 wherein the silicone is an amine-terminated poly(dialkylsiloxane).

13. The radiation curable composition of any of the previous embodiments wherein the silicone has a kinematic viscosity of 1×106 to 20×106 centistokes.

14. The radiation curable composition of embodiment 1, wherein the halomethyl-1,3,5-triazine is of the formula:

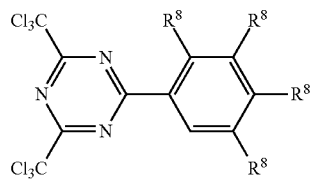

wherein each R8 is independently hydrogen, alkyl, or alkoxy; and 1-3 of the R8 groups are hydrogen.

15. The radiation curable composition of embodiment 1, wherein the halomethyl-1,3,5-triazine is of the formula:

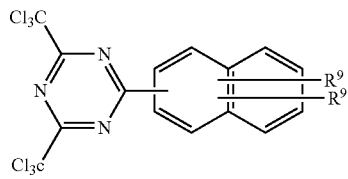

wherein each R9 is independently hydrogen, alkyl, or alkoxy.

16. The radiation curable composition of embodiment 1, wherein the halomethyl-1,3,5-triazine is of the formula:

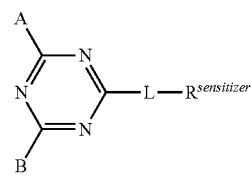

wherein
A is a mono-, di-, or trihalomethyl,
B is A, —N(R¹)₂, —OR¹, R¹, L-R$^{sensitizer}$ or -L-R$^{PI}$, where R¹ is H, alkyl or aryl;
L is a covalent bond or a (hetero)hydrocarbyl linking group, and
R$^{sensitizer}$ is a sensitizer group, and
L represents a hetero)hydrocarbyl group linking the sensitizer moiety to the triazine nucleus.

17. The radiation curable composition of any of the previous embodiments wherein the silicone is of the formula:

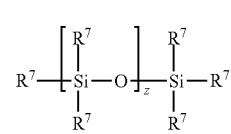

wherein
each R⁷ is independently an alkyl, alkoxy, aryl, or functional groups, with the proviso that at least one R⁷ group is a functional group, and z is at least 10.

18. The radiation curable composition of embodiment 17 wherein at least one of the R⁷ groups are selected from the group consisting of a hydride group, an amine group, a hydroxy group, and an epoxy group and the remaining R⁷ groups are non-functional groups.

19. The radiation curable composition of any of the previous embodiments wherein said silicone is a poly(dialkylsiloxane).

What is claimed is:
1. A radiation curable composition comprising
a) 95 to 99.9 parts by weight of silicone polymer, and
b) 0.1 to 5 parts by weight halomethyl-1,3,5-triazine crosslinking agent, the sum being 100 parts by weight; said silicone polymer selected from:

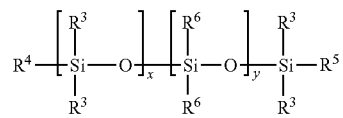

wherein
R³ is each independently an alkyl, aryl or alkoxy group;
R⁴ is H, an alkyl, aryl, alkoxy group, or a functional group including amine, or hydroxy groups;
R⁵ is H, an alkyl, aryl, alkoxy group, or a functional group including amine, or hydroxy groups;
R⁶ is H, an alkyl, aryl, alkoxy group, or a functional group including epoxy, amine, hydroxy groups, or —Si(R³)₂R⁵;
y is 0 to 20; and
x is at least 10; wherein at least one R⁴ or R⁵ is a functional group; or

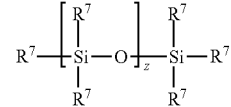

wherein
each R⁷ is independently an alkyl, alkoxy, aryl, or functional groups, with the proviso that at least one R⁷ group is a functional group consisting of an amine group, a hydroxy group and the remaining R⁷ groups are non-functional groups, and z is at least 10.

2. The radiation curable composition of claim 1 wherein the halomethyl-1,3,5-triazine is of the formula:

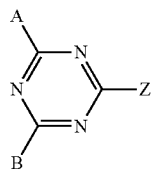

wherein

A is a mono-, di-, or trihalomethyl,

B is A, —N(R$^1$)$_2$, OR$^1$, R$^1$, L-R$^{sensitizer}$ or L-R$^{PI}$, where R$^1$ is H, or preferably alkyl or aryl;

Z is a conjugated chromophore, L-R$^{sensitizer}$ or -L-R$^{PI}$,

L is a covalent bond or a (hetero)hydrocarbyl linking group;

where R$^{sensitizer}$ is a sensitizer moiety capable of absorbing actinic radiation, and R$^{PI}$ is a photoinitiator moiety that is capable of initiating free radical or ionic chain polymerization upon exposure to actinic radiation.

3. The radiation curable composition of claim 2 wherein A and B are trichloromethyl.

4. The radiation curable composition of claim 2 wherein Z is an aryl group.

5. The radiation curable composition of claim 4 wherein Z is

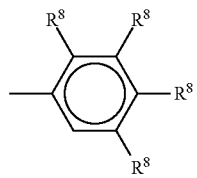

wherein each R$^8$ is independently H, alkyl, or alkoxy and 1-3 of said R$^8$ groups are H.

6. The radiation curable composition of claim 4 wherein Z is

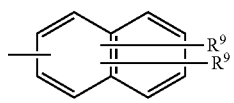

where each R$^9$ is independently H, alkyl, or alkoxy.

7. A radiation curable composition comprising
a) 95 to 99.9 parts by weight of silicone polymer, and
b) 0.1 to 5 parts by weight halomethyl-1,3,5-triazine crosslinking agent, the sum being 100 parts by weight;
wherein:
the halomethyl-1,3,5-triazine is of the formula:

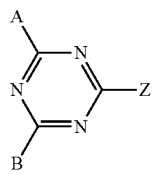

wherein

A is a mono-, di-, or trihalomethyl,

B is A, —N(R$^1$)$_2$, OR$^1$, R$^1$, L-R$^{sensitizer}$ or L-R$^{PI}$, where R$^1$ is H, or preferably alkyl or aryl;

Z is L-R$^{sensitizer}$,

L is (hetero)hydrocarbyl linking group, linking the sensitizer moiety to the triazine nucleus, provided that the chromophore of said triazine nucleus is not attached to the chromophore of said R$^{sensitizer}$ sensitizer moiety either directly by a covalent bond or by a conjugated linkage;

R$^{sensitizer}$ is a cyanine group, a carbocyanine group, a styryl group, an acridine group, a polycyclic aromatic hydrocarbon group, a polyarylamine group, or an amino-substituted chalcone group, and R$^{PI}$ is a photoinitiator moiety that is capable of initiating free radical or ionic chain polymerization upon exposure to actinic radiation; and said silicone polymer is selected from:

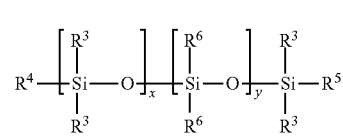

wherein

R$^3$ is each independently an alkyl, aryl or alkoxy group;

R$^4$ is H, an alkyl, aryl, alkoxy group, or a functional group including epoxy, amine, hydroxy groups, or —Si(R$^3$)$_2$R$^5$;

R$^5$ is H, an alkyl, aryl, alkoxy group, or a functional group including epoxy, amine, hydroxy groups, or —Si(R$^3$)$_2$R$^5$;

R$^6$ is H, an alkyl, aryl, alkoxy group, or a functional group including epoxy, amine, hydroxy groups, or —Si(R$^3$)$_2$R$^5$;

y is 0 to 20; and x is at least 10; or is selected from

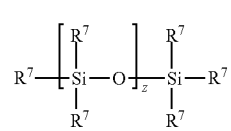

wherein each R$^7$ is independently an alkyl, alkoxy, aryl, or functional groups, with the proviso that at least one R$^7$ group is a functional group consisting of a hydride group; an amine group, a hydroxy group, and a methyl group an epoxy group and the remaining R$^7$ groups are non-functional groups, and z is at least 10.

8. A radiation curable composition comprising
a) 95 to 99.9 parts by weight of silicone polymer, and
b) 0.1 to 5 parts by weight halomethyl-1,3,5-triazine crosslinking agent, the sum being 100 parts by weight;

wherein:
the halomethyl-1,3,5-triazine is of the formula:

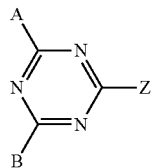

wherein
A is a mono-, di-, or trihalomethyl,
B is A, —N(R$^1$)$_2$, OR$^1$, R$^1$, L-R$^{sensitizer}$ or L-R$^{PI}$, where R$^1$ is H, or preferably alkyl or aryl;
Z is L-R$^{PI}$,
L is a (hetero)hydrocarbyl group linking the sensitizer moiety to the triazine nucleus;
R$^{sensitizer}$ is a sensitizer moiety capable of absorbing actinic radiation, and
R$^{PI}$ is a hydrogen-abstraction type photoinitiator group; and
said silicone polymer is selected from:

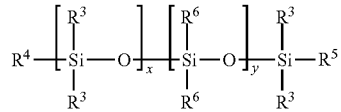

I wherein
R$^3$ is each independently an alkyl, aryl or alkoxy group;
R$^4$ is H, an alkyl, aryl, alkoxy group, or a functional group including epoxy, amine, hydroxy groups, or —Si(R)$_2$R$^5$;
R$^5$ is H, an alkyl, aryl, alkoxy group, or a functional group including epoxy, amine, hydroxy groups, or —Si(R$^3$)$_2$R$^5$;
R$^6$ is H, an alkyl, aryl, alkoxy group, or a functional group including epoxy, amine, hydroxy groups, or —Si(R$^3$)$_2$R$^5$;
y is 0 to 20; and
x is at least 10; or is selected from

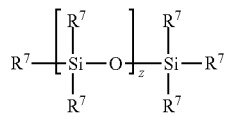

II wherein
each R$^7$ is independently an alkyl, alkoxy, aryl, or functional groups, with the proviso that at least one R$^7$ group is a functional group consisting of a hydride group an amine group, a hydroxy group, and a methyl group an epoxy group and the remaining R$^7$ groups are non-functional groups, and z is at least 10.

9. The radiation curable composition of claim 1 wherein the silicone has a kinematic viscosity of 1×10$^6$ to 20×10$^6$ centistokes.

10. The radiation curable composition of claim 1, wherein the halomethyl-1,3,5-triazine is of the formula:

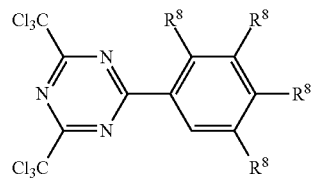

wherein each R8 is independently hydrogen, alkyl, or alkoxy; and 1-3 of the R8 groups are hydrogen.

11. The radiation curable composition of claim 1, wherein the halomethyl-1,3,5-triazine is of the formula:

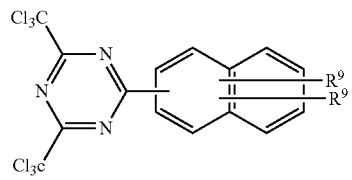

wherein each R9 is independently hydrogen, alkyl, or alkoxy.

12. The radiation curable composition of claim 1, wherein the halomethyl-1,3,5-triazine is of the formula:

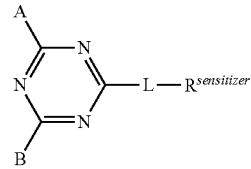

wherein
A is a mono-, di-, or trihalomethyl,
B is A, —N(R$^1$)$_2$, OR$^1$, R$^1$, L-R$^{sensitizer}$ or L-R$^{PI}$, where R$^1$ is H, or preferably alkyl or aryl;
L is a covalent bond or a (hetero)hydrocarbyl linking group, and
R$^{sensitizer}$ is a sensitizer group, and
L represents a hetero)hydrocarbyl group linking the sensitizer moiety to the triazine nucleus.

13. The radiation curable composition of claim 1 wherein the silicone is selected from the group consisting of:

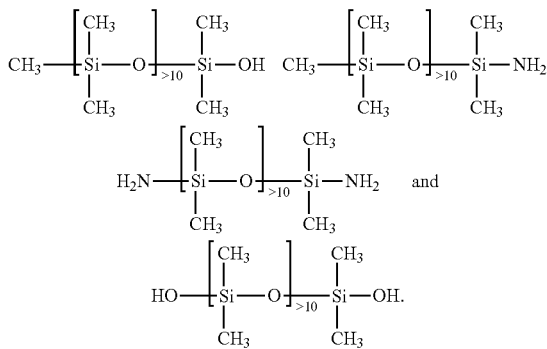

14. A cured coating comprising the radiation curable composition of claims 1, 7 and 8 on a substrate.

* * * * *

UNITED STATES PATENT AND TRADEMARK OFFICE
CERTIFICATE OF CORRECTION

PATENT NO. : 9,663,690 B2
APPLICATION NO. : 14/437045
DATED : May 30, 2017
INVENTOR(S) : Joon Chatterjee et al.

It is certified that error appears in the above-identified patent and that said Letters Patent is hereby corrected as shown below:

In the Specification

Column 5,
Line 42, delete "$OR^1$," and insert -- —$OR^1$, --, therefor.
Line 42, delete "$L-R^{PI}$," and insert -- —$L-R^{PI}$, --, therefor.

Column 15,
Line 52, delete "5-triazine" and insert -- S-triazine --, therefor.

Column 16,
Line 7, delete "bubbles," and insert -- bubbles. --, therefor.
Line 14, delete "em/minute" and insert -- cm/minute --, therefor.
Line 25, delete "KIM WIPE" and insert -- KIMWIPE --, therefor.
Line 32, delete "(Mass" and insert -- (IMass --, therefor.

Column 18,
Line 45, delete "moeity" and insert -- moiety --, therefor.

In the Claims

Column 21,
Line 14, in Claim 2, delete "$OR^1$," and insert -- —$OR^1$, --, therefor.
Line 14, in Claim 2, delete "$L-R^{PI}$," and insert -- —$L-R^{PI}$, --, therefor.
Line 15, in Claim 2, after "H," delete "or preferable".

Column 22,
Line 3, in Claim 7, delete "$OR^1$," and insert -- —$OR^1$, --, therefor.
Line 3, in Claim 7, delete "$L-R^{PI}$," and insert -- —$L-R^{PI}$, --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,663,690 B2

Column 22,
Line 4, in Claim 7, after "H," delete "or preferable".
Line 34, in Claim 7, delete "groups," and insert -- group, --, therefor.
Line 37, in Claim 7, delete "groups," and insert -- group, --, therefor.
Line 59, in Claim 7, delete "group;" and insert -- group --, therefor.

Column 23,
Line 14, in Claim 8, delete "OR$^1$," and insert -- —OR$^1$, --, therefor.
Line 14, in Claim 8, delete "L-R$^{PI}$," and insert -- —L-R$^{PI}$, --, therefor.
Line 15, in Claim 8, after "H," delete "or preferable".
Line 36, in Claim 8, delete "groups," and insert -- group, --, therefor.
Line 37, in Claim 8, delete "—Si(R)$_2$R$^5$;" and insert -- —Si(R$^3$)$_2$R$^5$; --, therefor.
Line 39, in Claim 8, delete "groups," and insert -- group, --, therefor.

Column 24,
Line 38, in Claim 12, delete "OR$^1$," and insert -- —OR$^1$, --, therefor.
Line 38, in Claim 12, delete "L-R$^{PI}$," and insert -- —L-R$^{PI}$, --, therefor.
Line 39, in Claim 12, after "H," delete "or preferable".